UNITED STATES PATENT OFFICE.

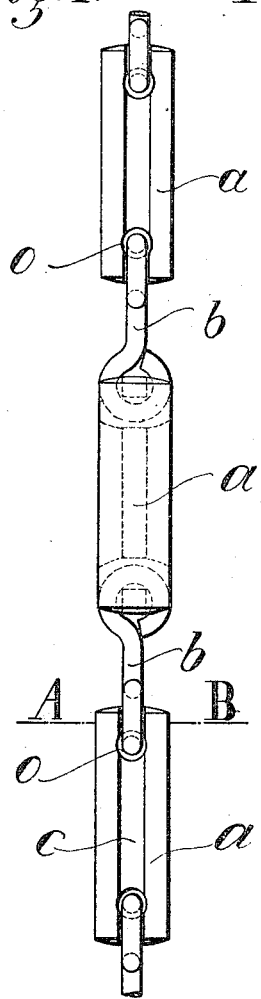
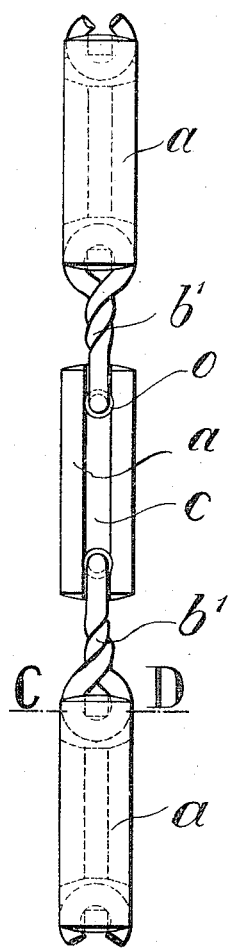
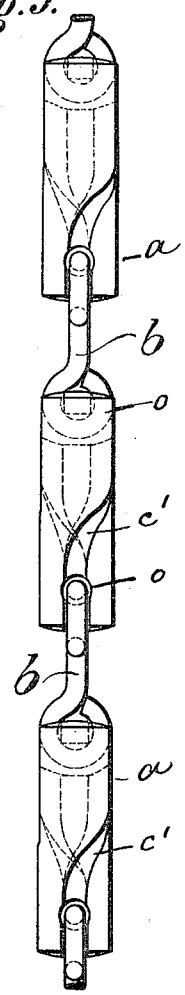
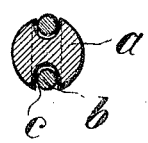

WALTER SCHÜRMANN, OF DUSSELDORF, GERMANY.

FLEXIBLE SHAFT.

1,137,794.      Specification of Letters Patent.      Patented May 4, 1915.

Application filed November 23, 1912. Serial No. 733,063.

*To all whom it may concern:*

Be it known that I, WALTER SCHÜRMANN, a citizen of the Empire of Germany, residing at 14 Breitestrasse, Dusseldorf, in the Empire of Germany, have invented a new and useful Flexible Shaft, of which the following is a specification.

My invention relates to a flexible shaft composed of bar-shaped links of I-shaped cross section and of wire links, these two kinds alternating with one another.

In the accompanying drawing: Figure 1 is a side view of a flexible shaft embodying my invention; Fig. 2 is a cross section on line A—B, Fig. 1; Fig. 3 a side view of a modification of the shaft; Fig. 4 a cross section on line C—D, Fig. 3, and Fig. 5 a side view of a further modification.

As shown in Figs. 1–4, the flexible shaft consists of bar-shaped links $a$ $a$ and wire links $b$ $b$ alternating with one another. The links $a$ $a$ are cut from a rod of I-shaped cross section shown at Fig. 4 which rod may also be considered to be a cylinder with two opposite longitudinal parallel diametrically disposed surface grooves $c$ $c$.

Each of the grooves $c$ has preferably a semicircular bottom that merges into outwardly extending parallel straight sides, the depth of each groove being such as to accommodate the thickness of wire from which links $b$ are made.

The several links $a$ $a$ may have spherical end faces, as shown, or may be made of any other cross section desired. Each link $a$ is provided near each end with a transverse hole $o$ opening into the grooves $c$ at some distance from the ends of the links, the diameter of each hole being greater than the width of the groove. The wire links $b$ may be straight and similar to the links of ordinary long-limbed chains. The wire from which these links are made has a diameter slightly smaller than the width of the grooves $c$ $c$, so that there is a small play left between the wire links $b$ $b$ and the walls of the grooves as shown. Inasmuch as the perforations $o$ are larger than the width of the grooves $c$, each link $b$ may readily assume an inclined position relatively to the longitudinal axis of the coöperating link $a$, thus adding to the flexibility of the entire shaft while on the other hand, the comparatively close fit between the widest portion of the eye of each link $b$ and the adjacent sides of grooves $c$ will prevent any excessive play between links $a$ and $b$ in the direction of rotation of the shaft. Links $b$ may be either formed as illustrated in Fig. 1, in which the ends of the links are bent into a circle to form closed eyes, or the wire ends may be intertwisted with the shanks as at $b^1$, Fig. 3, and welded together. In both cases, the eyes of each link $b$ are shown to be arranged at right angles to each other, but it is obvious that they may also be arranged in alinement. So also the groove $c^1$ of each link $a$ may be made in the form of a spiral of 90 degrees torsion, as shown in Fig. 5. Besides accommodating the eyes of links $b$, the grooves of links $a$ have the function of permitting a free distribution of the lubricating oil along links $a$.

Owing to the constant twisting under strain of the adjoining links in a flexible shaft, it is most essential that a perfect lubrication of the entire shaft be maintained to prolong the life thereof. As shafts of the character described are in practice usually inclosed within flexible casings, the lubrication of the shafts throughout their length is greatly impaired. To nevertheless effect perfect lubrication, the longitudinal grooves $c$ are provided to constitute distributing channels along which the lubricant may creep from end to end, while the flexible casing prevents said lubricant from being thrown off by centrifugal force.

The flexible shaft with straight wire links described presents the advantage, that each link is practically prevented from being displaced with regard to the neighboring links by turning around the axis of the shaft, since there is but a small play left between the side parts of the wire links $b$ $b$ and the walls of the grooves $c$ $c$ in the bar-shaped links $a$ $a$. In consequence of this each link is enabled on being driven to drive the next following link in a favorable manner, since it has a sufficiently large lever-arm for transmitting the power.

The flexible shaft can be made of iron, steel and other materials. The wire links $b$ $b$ are made in a similar manner to the links of ordinary chains, viz. by suitably bending wire pieces and welding together the ends.

I claim:

1. A flexible shaft comprising a series of bar-shaped links, each of said links being provided with a pair of longitudinally extending, diametrically opposed lubricant-distributing grooves and with a pair of perforations extending transversely through said bar-shaped links in proximity to the ends thereof and opening into said grooves, the grooves and perforations jointly forming transverse pivotal openings in said bar-shaped links, and wire links alternating with said bar-shaped links, each of said wire links having an eye at each end that engages in an opening of a bar-shaped link and engages the adjacent groove-sides.

2. A flexible shaft comprising a series of bar-shaped links, each of said links being provided with a pair of longitudinally extending, diametrically opposed lubricant-distributing grooves and with a pair of perforations extending transversely through said bar-shaped links in proximity to the ends thereof and opening into said grooves, the grooves and perforations jointly forming transverse pivotal openings in said bar-shaped links, the diameter of the perforations exceeding the width of the grooves, and wire links alternating with said bar-shaped links, each of said wire links having an eye at each end that engages in an opening of the bar-shaped link and engages the adjacent groove-sides, whereby a tilting movement of the wire link relatively to the bar-shaped link is rendered possible while a rotation of said links relatively to each other is prevented.

WALTER SCHÜRMANN. [L. S.]

Witnesses:
 HELEN NUFER,
 ALBERT NUFER.

Copies of this patent may be obtained for five cents each, by addressing the "Commissioner of Patents Washington, D. C."